United States Patent [19]

Riera et al.

[11] 4,354,409
[45] Oct. 19, 1982

[54] FLYING CUTOFF MACHINE

[76] Inventors: John F. Riera, 3689 Sandburg, Troy, Mich. 48084; Billy J. Bielawski, Sr., 8065 Robinwood, Detroit, Mich. 48234; John J. Pavelec, 4155 Three Oaks, Apt. 2A, Troy, Mich. 48098

[21] Appl. No.: 231,247
[22] Filed: Feb. 3, 1981
[51] Int. Cl.³ .............................................. B23D 25/06
[52] U.S. Cl. .......................................... 83/285; 83/319; 83/320
[58] Field of Search .................. 83/318, 319, 320, 285

[56] References Cited

U.S. PATENT DOCUMENTS

| 3,288,011 | 11/1966 | Borzym | 83/319 X |
| 3,288,012 | 11/1966 | Borzym | 83/319 X |
| 4,228,706 | 10/1980 | Borzym | 83/320 |
| 4,301,723 | 11/1981 | Borzym | 83/320 X |

*Primary Examiner*—James M. Meister
*Attorney, Agent, or Firm*—Fisher, Gerhardt, Crampton & Groh

[57] ABSTRACT

A flying cutoff machine for severing elongated material moving continuously longitudinally of its length wherein a die carriage is attachable to the material for movement therewith and includes a reciprocating cutting blade for severing the material. The machine has a frame with a bed slidably supporting the carriage and an elongated ram extending parallel to the bed with the ram being supported through a link and slide arrangement so that the ram is maintained parallel to the bed. The ram is driven by a single crank arrangement to move in a orbital path relative to the bed during sliding movement on the slide member which supports the ram.

13 Claims, 3 Drawing Figures

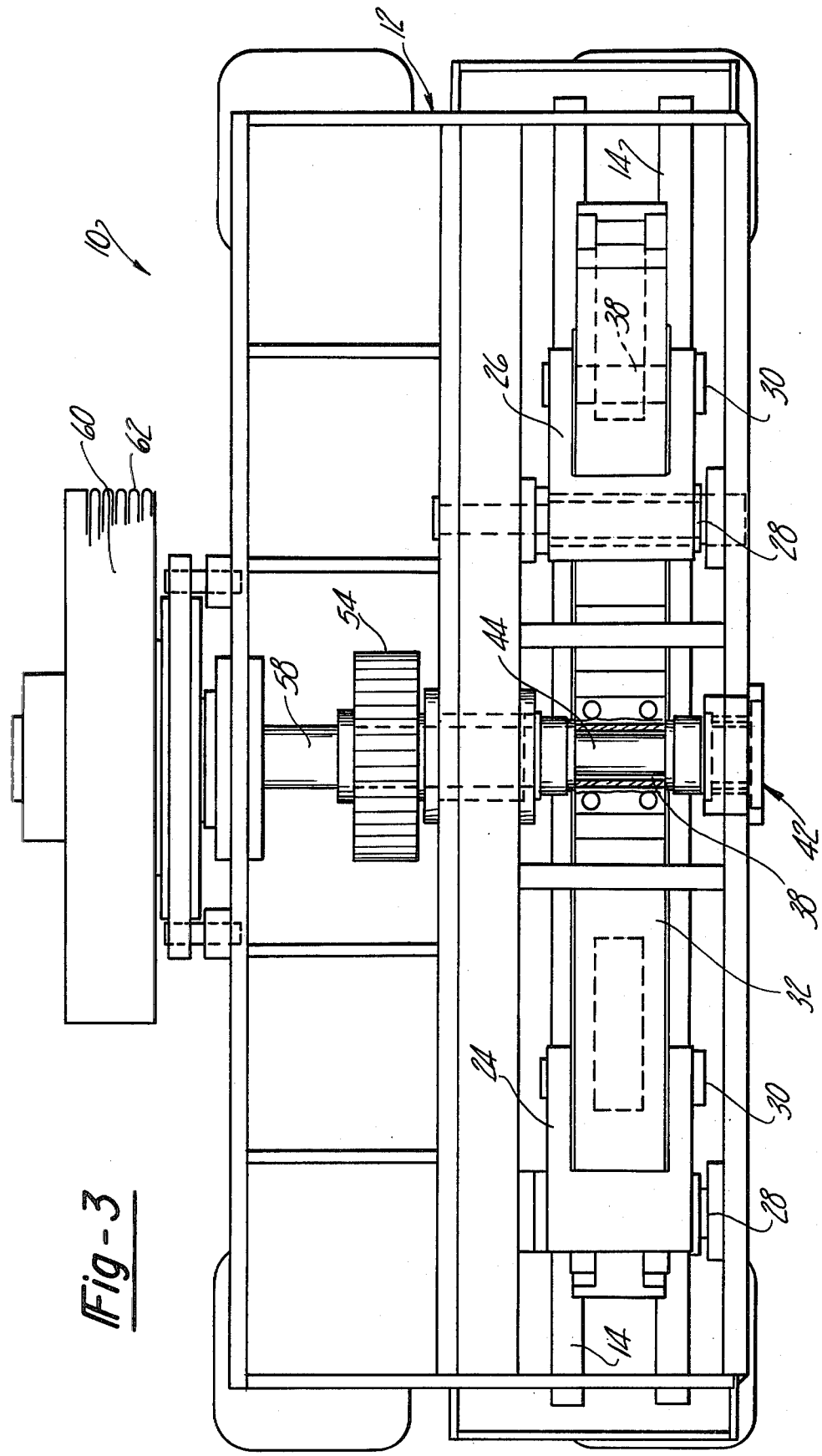

FLYING CUTOFF MACHINE

This invention relates to machines for cutting continuously moving material such as tubing.

Various forms of cutting machines have been used, most of which employ a sliding carriage which is clamped to the material to be cut to move therewith. During movement of the carriage with the material, a blade is moved transversely to sever the material and thereafter is returned to its initial position. Thereafter, the carriage is detached from the material and is returned to its home or starting point in readiness to make the next cut. The force for clamping the carriage to the material and for moving the blade through the material during the cutting operation is produced by a head or ram having a vertical component of movement. Such vertical components of movement can be and have been produced by reciprocating the head in a vertical path, by swinging the head or ram in an arc toward and away from the material or by moving the ram in an orbital path. All of such movements must supply the necessary amount of force and at the same time permit the cutting carriage mechanism to move with the material and relative to the remainder of the machine. Machines affording parallel vertical movement are expensive and require relatively heavy frames and accurately machined guides and supports. Swinging rams are more economical but speed of operation is limited because of the requirement for changing direction of movement of the ram at opposite ends of the arc of swinging. Machines with orbital movement typically are used for heavier duty application but are expensive because of the requirement for at least a pair of cranks which must be syncronized with each other through expensive gears to insure parallel movement of the head relative to the path of the moving material.

It is an object of this invention to provide a cutoff machine for continuously moving material which employes the advantages of orbital movement of the ram and the suspension advantages of swinging types of rams.

The invention contemplates a flying cutoff machine which cuts material during its continuous movement longitudinally of its length. The machine has a bed extending longitudinally and parallel to the movement of the material and an elongated ram is supported to extend parallel to the bed. The means supporting the ram include a slide member movable longitudinally of the ram and a pair of links attached to the frame and to opposite ends of the slide member to form a parallelogram support assembly which maintains the slide member horizontally of the bed during swinging movement in an arc relative to the machine frame. The ram itself is driven by a rotating crank so that the ram moves in a orbital path relative to the frame during reciprocating movement on the slide. A lower guide is formed on the bed and an upper guide on the ram which support, guide and actuate a die carriage which is clamped to the moving material to move therewith and to cut the material all in response to the vertical components of movement of the ram.

A preferred embodiment of the invention is illustrated in the accompanying drawings in which:

FIG. 3 is a top plan view with portions shown in cross-section.

Figure 1:
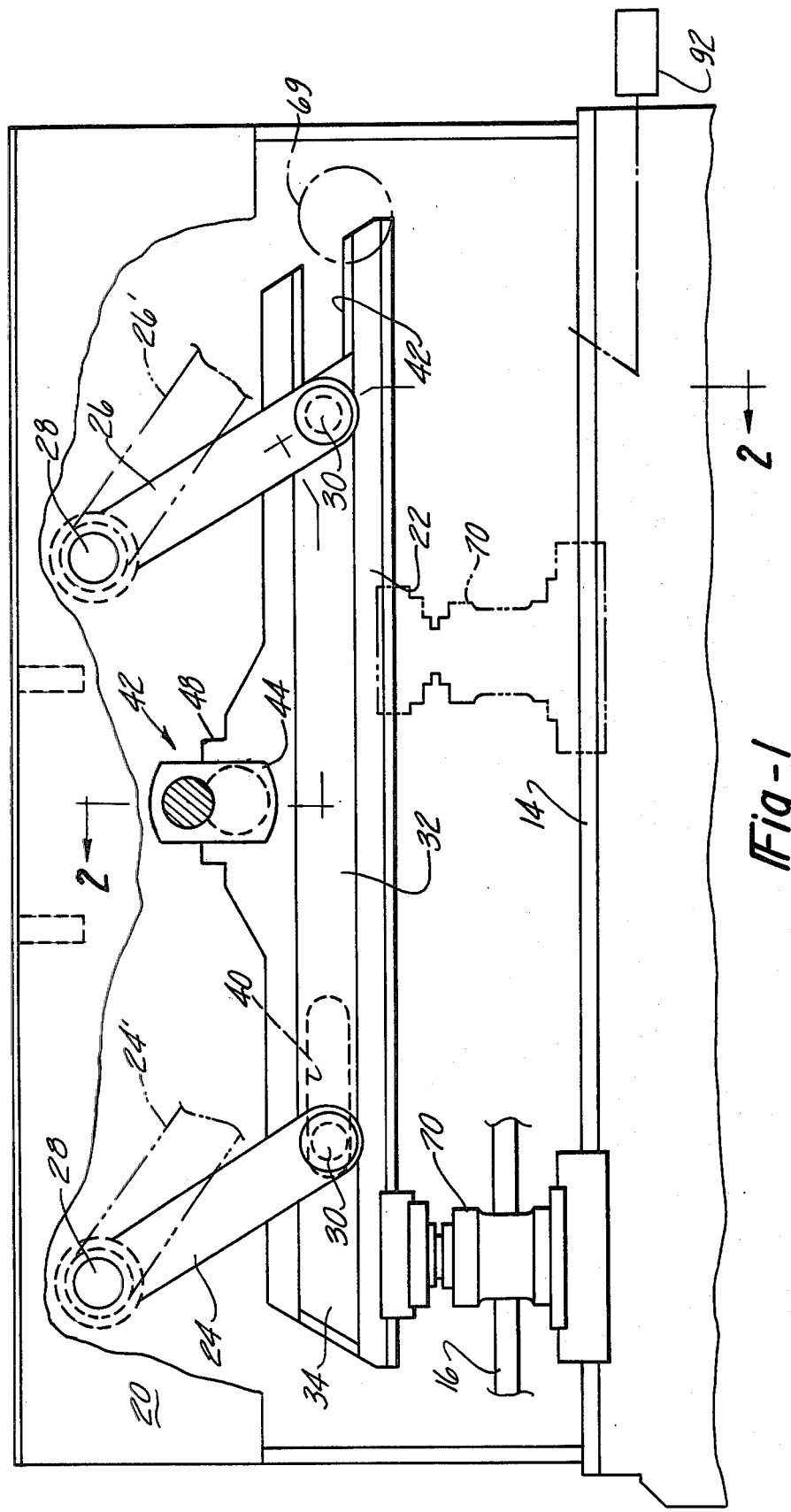
FIG. 1 is a side elevation of the flying cutoff machine embodying the invention with portions broken away and removed in the interest of clarity.

Referring to the drawings, a cutoff machine embodying the invention is designated generally at 10 and includes a frame 12 having a horizontal bed 14 extending generally longitudinally of the path of the material to be cut. In the present instance such material is designated as tubing 16 being delivered continuously from a source such as a tubing machine, not shown, which would be located to the left of the machine as viewed in FIG. 1. Such tubing 16 can have various shaped cross-sections or the material to be cut can have various other cross-sectional shapes such as channels, T's or the like.

The frame 12 also includes a head portion 20 spaced above the bed 14. A ram 22 is suspended from the head 20 by means of a pair of link assemblies 24 and 26 having their upper ends pivotally connected to the head 20 by means of pins 28 and their lower ends connected by way of pins 30 to a slide assembly 32. The slide assembly 32 extends generally longitudinally of the bed 14. The ram 22 is generally in the form of an I-beam with opposite sides forming opposed guide grooves 34. The guide grooves 34 slidably receive slide portions 36 held in spaced apart relationship by collars 38. The lower pins 30 pass through the collars 38 which are free to slide longitudinally of the ram 22 in slots 40 and 42 extending transversely of the ram 22.

The horizontal spacing of the pins 28 and 30 is equal and the length of the link assemblies 24 and 26 between the pins 28 and 30 also is equal. As a consequence, a parallel link system is formed so that during swinging of the links, the slide assembly 32 and therefore the ram 22 moves in parallel relationship to the bed 14.

Figure 2:
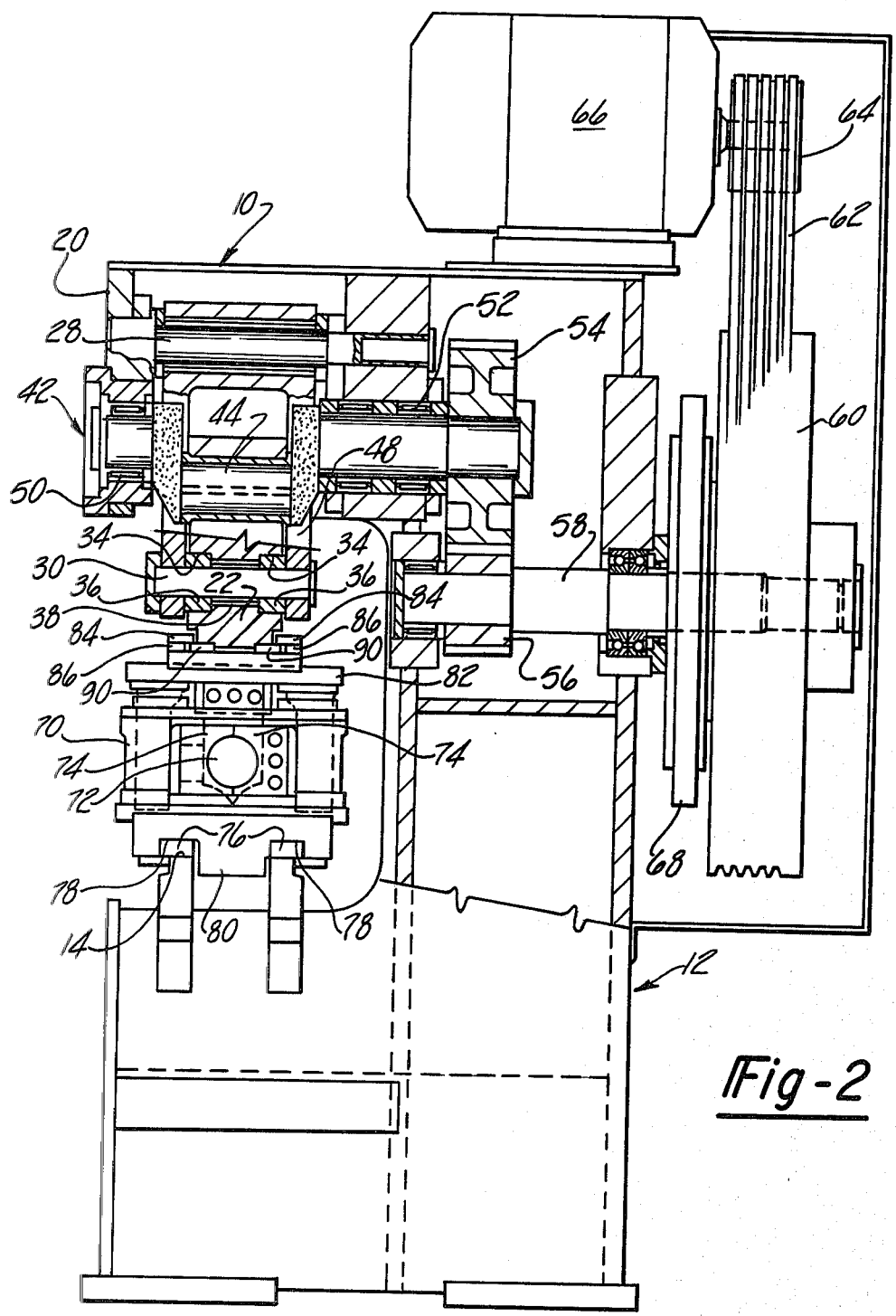
FIG. 2 is a broken sectional view taken generally on line 2—2 in FIG. 1.

Motion is imparted to the ram 22 by means of a crank assembly 42 having a crank pin portion 44 journaled in a bearing mounted in a support portion 48 formed at the upper side of the ram 22 and intermediate its ends. The crank assembly 42 is journaled in main bearings 50 and 52 supported in the head 20. As best seen in FIG. 2, one end of the crank shaft assembly 42 is provided with a bull gear 54 which is meshed with a pinion gear 56 mounted on a drive shaft 58. The drive shaft 58 is supported for rotation relative to the frame 12 and is provided with a flywheel 60 driven by belts 62 passing over the flywheel 60 and a drive pulley 64 on the output shaft of an electric motor 66 mounted at the upper end of the frame 12. A clutch, not shown, and a brake 68 are disposed between the flywheel 60 and the pinion gear 56.

Rotation of the crank assembly 42 imparts an orbital movement to the ram 22 during which time the ram slides relative to the slide assembly 32 which in turn swings in an arc indicated in FIG. 1 by the full line position of the link assemblies 24 and 26 and the broken line position indicated at 24' and 26'. The orbital path for the lower right corner of the ram 22 is indicated by the circular path indicated in broken lines at 69. As seen in FIG. 1, the crank pin 44 is at the bottom of its stroke. In that condition the ram 22 is in its lowest position with the parallel link assemblies 24 and 26 disposed at an angle to the vertical and with the slide assembly 32 toward the left end of the slots 40 and 42.

Assuming that the crank pin 44 is rotating in a counter-clockwise direction as viewed in FIG. 1, the ram 22 will move upwardly during movement of the tubing material which is moving to the right in FIG. 1 until the crank pin 44 reaches its highest position. Under those conditions, the ram 22 also will be in it highest position. Subsequent continued rotation causes the ram 22 to move downwardly and it is this portion of the ram movement which is used to clamp the cutting mechanism to the moving material and to sever the material.

The mechanism which does the actual cutting is in the form of a carriage 70 which as seen in FIG. 2 supports a cutoff blade 72 for vertical movement relative the bed 14 and the path of movement of the material 16. The carriage 70 is well known in the art and will be described only generally since the specific form is not necessary to an understanding of the present invention. The carriage 70 includes a pair of clamp jaws 74 which are adapted to engage opposite sides of the material to be cut, in this instance, tubing 16.

The carriage 70 is supported for sliding movement in the direction of material movement and on the bed 14 by a pair of transversely spaced rails 76 forming part of the bed which are received in guide slots 78 in the bottom of a base member 80 of carriage 70.

A ram associated portion of the carriage 70 has a blade support member 82 with a guide assembly in the form of a pair of flange bars 84 and spacer bars forming a pair of facing guide grooves which receive guide rails 90 fixed to and extending parallel to the ram 22 and therefore to the bed 14.

During rotation of the crank assembly 42 and orbital movement of the ram 22, the carriage 70 slides relative to both the bed 14 and the ram 22. At the same time, the blade support 82 is reciprocated vertically downwardly relative to the base member 80 to cut and subsequently is retracted upwardly. The distance the carriage 70 slides is determined by the speed of movement of the material and the time required to reciprocate the blade support 82.

The full cycle of operation of the machine 10 can be considered as starting at a point at which a cut of the tubing or other material 16 has just been completed. Under that condition, the ram 22 will be at its lowest position exemplified by the broken line position of the carriage 70. At that time, the blade 72 will be at the bottom of its cutting stroke and the counter-clockwise movement of the crank assembly 42 will cause the ram 22 to move upwardly carrying with it the blade support 82. Initial movement will release or retract the jaws 74 from the tubing 16 permitting the tubing to continue moving to the right relative to the machine bed 14. Such release is commonly obtained by the use of cams, not shown. After release of the jaw 74, a return mechanism indicated diagrammatically by an air cylinder 92 or other mechanism can be employed to return the carriage 70 from the phantom line position to the left to the full line position illustrated in FIG. 1. As the crank pin 44 reaches its top or twelve o'clock position, the blade 72 will be fully retracted. At this point, the drive for the ram may be disengaged by the clutch and the brake 69 can be applied to the stop further cranking movement. Under that condition, the ram 22 will be in an elevated position and the blade 72 will be fully retracted together with the blade support 82 at its most elevated position. The machine can remain in this condition during the time the tubing material 16 continues to move to the right until the desired length of material 16 has been advanced. At the appropriate time, and in response to various forms of mechanisms such as limit switches, the air cylinder 92 or other accelerating mechanism can be signaled to accelerate the carriage 70 to the speed of the moving material. At the same time, the brake 69 can be disengaged and the clutch engaged to continue rotation of the crank mechanism 42 in a counter-clockwise direction. Such movement results in downward movement of the ram 22 which causes the carriage 70 to be clamped to the tubing 16 for movement therewith and continued downward movement of the ram 22 moves the blade support 82 downwardly together with the blade 72 to cause the tubing 16 to be severed. The severing action will occur at some location such as that indicated by the phantom line position in FIG. 1 although it can occur anywhere along the length of the ram 22, depending on the speed at which the material 16 is being advanced and the speed of operation of the ram 22. After a cut is completed, the next cycle of operation is initiated during which the material 16 is advanced to the right and the carriage 70 is returned to its starting or home position at the left.

Although the machine 10 has been described in terms of cutting continuously moving material and making repetative cuts it should be understood that the machine can be loaded manually to make single cuts while the material is stationary. Under such instances the machine is operated until the ram 22 is in an elevated position. Material such as the tubing 16 can then be moved between the open jaws 74 to position the tubing in a desired location relative to the blade 72. With the tubing 16 held in the desired location, the ram 22 can be moved through the motor 66 in a counter-clockwise direction to lower the ram 22 and the same time the blade 72 to sever the material.

It will be noted that the ram 22 is supported and guided by the parallel link assemblies 24 and 28 connected to the slide assembly 32. Power for moving the ram 22 is supplied through a single crank assembly 42 which imparts an orbital movement to the ram 22. The orbital movement of the ram swings the link assemblies in an arc thereby causing the slide assembly to reciprocate and to slide relative to the ram 22. In this manner, orbital movement of a ram is achieved to take advantage of the capability of cutting heavier materials at high speeds because the ram 22 is travelling in the direction of the moving material during the cutting operation.

It has been found that the angular placement of the links contributes significantly to the operation of the machine 10. For example, if the links 24 and 26 depended vertically when the ram 22 is in its lowered position, the relative sliding movement between the slide 32 and the ram 22 would be approximately twice as much to attain the same maximum elevated position as with angled links. Consequently, by disposing the links at an angle it is possible to obtain the benefit of support for the ram 22 with a minimum of relative movement between the slide 32 and ram 22. This minimizes the amount of movement and wear on the relatively moving parts and also the amount of power required to move the ram 22 in an orbital path.

The guided movement afforded by the slide assembly and the ram avoids expensive guides required of heads or rams having purely vertical motion and has the advantages and economies of link supported rams. At the same time orbital movement of the ram rather than swinging movement of the ram is achieved through the link and slide arrangement so that orbital movement is produced by a single crank assembly thereby avoiding the problem of synchronizing movement between a pair of crank supports.

The embodiments of the invention in which an exclusive property or privilege is claimed are defined as follows:

1. A cutoff machine for severing elongated material moving continuously longitudinally of its length and having a die carriage attachable to the material for movement therewith including a transversely reciprocating cutting die for severing material during its movement, comprising: a frame having a bed portion slidably supporting said carriage member, an elongated ram extending parallel to said bed, means supporting said ram for movement in spaced relation to said bed including a slide member connected to said ram for relative sliding movement longitudinally of said ram and a pair of links attached to said slide member and to said frame to support said slide member for swinging movement parallel to said bed, rotating drive means having a crank operatively connected to said ram for reciprocating said ram relative to said slide member and moving said ram in an orbital path relative to said bed, and guide means on said ram connecting said cutting die for sliding movement longitudinally of said ram and transverse reciprocating movement relative to said bed during orbital movement of said ram relative to said bed.

2. The cutoff machine of claim 1 wherein said rotating drive means is connected directly to said ram by means of a crank pin.

3. The cutoff machine of claim 1 wherein said bed portion is disposed horizontally and said ram is disposed above said bed portion.

4. The cutoff machine of claim 1 wherein said links are of equal length and depend from a portion of said frame to said slide member.

5. The cutoff machine of claim 4 wherein said links are parallel to each other and are disposed at an angle to said bed during the full range of swinging movement of said slide member.

6. The cutoff machine of claim 4 wherein said links are disposed at an acute angle to said bed portion when said ram is closest to said bed portion.

7. The cutoff machine of claim 5 wherein said links are disposed at an angle to converge with said material in the direction of movement of said material.

8. The cutoff machine of claim 1 wherein the direction of rotation of said rotating drive means when said ram is closest to said bed portion is in the direction of movement of said material.

9. The cutoff machine of claim 1 wherein the amount of relative sliding movement of said slide member and said ram is at a minimum when said ram is approaching said bed portion.

10. In a flying cutoff machine for severing elongated material moving continuously longitudinally of its length in a horizontal path, the combination of: a machine frame having a bed portion extending parallel to the movement of said material, an elongated ram extending parallel and in elevated relation to said bed portion, means supporting said ram for movement in elevated position above said bed portion including a slide member movable longitudinally of said ram and a pair of parallel links of equal length attached to said frame and to opposite ends of said slide member to support said slide member horizontally during swinging movement of said links in an arc relative to said machine frame, rotating drive means having a crank operatively connected to said ram for moving said ram in an orbital path relative to said frame during reciprocating movement relative to said slide, a lower guide on said bed portion and an upper guide on said ram, cutoff apparatus slidably supported on said lower guide and including portions slidably engageable with said upper guide to clamp said cutoff apparatus to said material for movement therewith and to cut said material in response to the vertical component of movement of said ram.

11. The cutoff machine of claim 10 wherein said links are disposed to swing in an arc in which said links are at an angle to said ram throughout the arc of swinging movement.

12. The cutoff machine of claim 11 where said links converge with said slide in the direction of movement of said material.

13. The cutoff machine of claim 10 where said drive means include a clutch and brake or initiating and stopping rotation of said crank.

* * * * *